(Model.) 2 Sheets—Sheet 1.
W. A. HAZELRIGG.
CORN PLANTER.
No. 251,879. Patented Jan. 3, 1882.
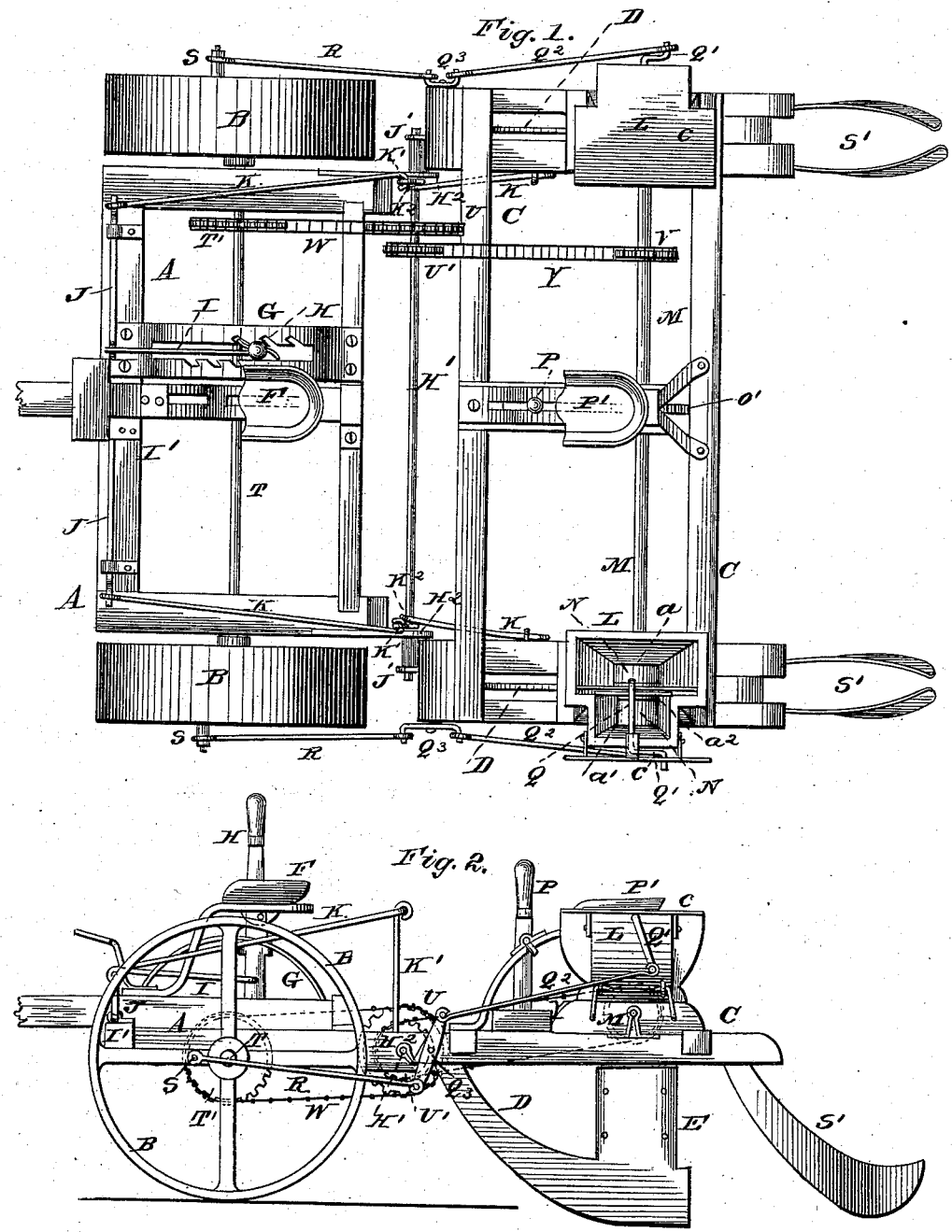
WITNESSES
INVENTOR
Wm. A. Hazelrigg
by Anderson & Smith
his Attorneys (Model.) 2 Sheets—Sheet 2.
W. A. HAZELRIGG.
CORN PLANTER.
No. 251,879. Patented Jan. 3, 1882.
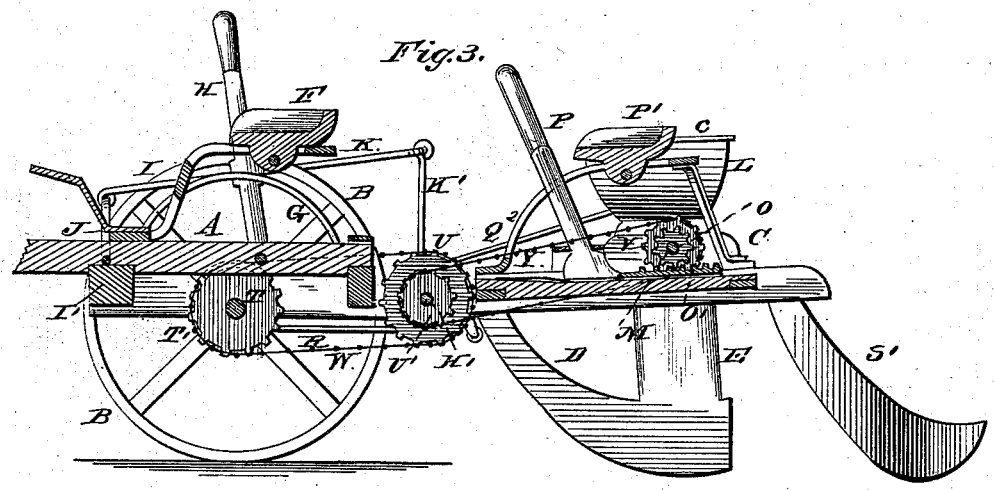
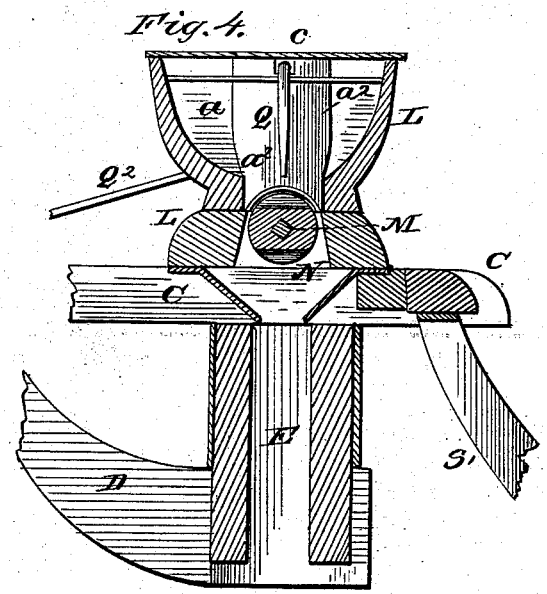
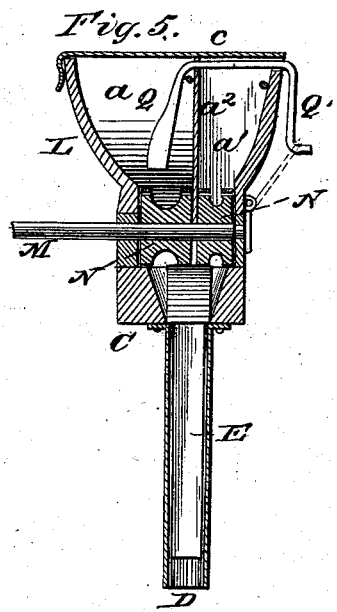
WITNESSES
INVENTOR
Wm. A. Hazelrigg,
by Anderson & Smith
his Attorneys

UNITED STATES PATENT OFFICE.

WILLIAM A. HAZELRIGG, OF NAPOLEON, INDIANA.

CORN-PLANTER.

SPECIFICATION forming part of Letters Patent No. 251,879, dated January 3, 1882.

Application filed October 1, 1881. (Model.)

*To all whom it may concern:*

Be it known that I, WILLIAM A. HAZELRIGG, a citizen of the United States, resident of Napoleon, in the county of Ripley and State of Indiana, have invented a new and valuable Improvement in Corn-Planters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my invention. Fig. 2 is a side elevation thereof. Fig. 3 is a longitudinal section. Fig. 4 is an enlarged sectional view of one of the seed-boxes, and Fig. 5 is a cross-section of the same.

This invention has relation to corn-planters; and it consists in the novel construction and arrangement of the hinged frame mounted on the driving-wheels, and the openers, the double dropping-cups, double hoppers, dropping-rack, lever and pinion, double rack and adjusting-levers, rock-lever, and connecting-arms, as will be hereinafter fully described, and pointed out in the claims.

Referring by letters to the accompanying drawings, A designates the front section of the hinged frame, mounted on wheels B B; and C designates the rear portion of the hinged frame, supported by the openers D and dropping-tubes E.

The section A is provided with a driver's seat, F, and a double rack, G, near by, for locking a lever, H, connected by a rod, I, to a rock-shaft, J, having bearings in the front cross-bar, I', of the section A.

The hinge between the sections A and C is formed by a shaft, H', passed through perforated arms $H^2$, extending rearwardly from the front section, A, and entering eyes J', extending forwardly from the rear section, C, of the hinged frame. From the rock-shaft J arms K extend rearwardly and connect with a vertical arm, K', of a spring, $K^2$, coiled around the shaft H' and secured to the rear section, C, of the frame, as shown.

The rear section, C, of the hinged frame carries the double hoppers L L, the larger compartment, $a$, being for the fertilizer and the smaller, $a'$, for the corn, a removable partition, $a^2$, separating them. A shaft, M, extends from base to base of the hoppers L L, and is provided with double dropping-cups N N. The hoppers are removable by means of hooks and pins, as shown, in order to clean the cups, and a cover, $c$, is provided for both of them.

The shaft M is provided with a central gear-wheel, O, which engages a removable rack, O', operated by a lever, P, for the purposes of dropping the seed and fertilizer at intervals, controlled by the operator, who occupies the seat P', which is also removable.

An agitator, Q, having a crank-arm, Q', extends over the corn-box, and is operated by a rod, $Q^2$, connected to a pivoted or rocking lever, $Q^3$, and a rod, R, connected to a wrist-pin, S, on the arm of the driving-wheel. These parts are duplicated, as shown. Coverers S' follow the openers D.

The axle T is provided with a chain-wheel, T', the shaft H' is provided with two chain-wheels, U U', and the shaft M is provided with a chain-wheel, V. Chains W and Y connect these chain-wheels and are operated by the driving-wheels, the dropping-lever and rack having been first removed to convert the planter into a drill. In the latter instance the shaft M is revolved and the corn and fertilizer drilled in and covered, while in the former instance the dropping-lever P is operated at will by an occupant of the rear seat. It will therefore be seen that the planter may be converted into a drill by simply removing the lever and rack engaging the pinion O and adjusting the chains which operate the several shafts.

Having thus fully described my invention, what I claim as new, and desire to secure by Letters Patent, is—

1. In a corn-planter, the hinged frame or section A, carrying the double rack, adjusting-lever, rock shaft, and connecting-rod, in combination with the frame C, carrying the double hoppers, the dropping-lever, sliding rack, feed-shaft, and the dropping-cups, and the hinge consisting of the shaft H' and the spring-arms K' $K^2$, substantially as specified.

2. In a corn-planter, the hinged frame A, carrying the double rack and adjusting-lever, in combination with the frame C, carrying the double hoppers, the dropping-lever P, sliding rack O', the shaft M, having pinion O and dropping-cups N N, and the agitators Q Q', rods Q², rocking levers Q³, and rods R, connected to the wheels B, substantially as specified.

3. In a corn-planter, the section A, provided with the gear T' upon its axle T, the hinge consisting of the shaft H', supported in bearings, as shown, and having spring-arms K' K², and the gears U U', in combination with the section C, carrying the double hoppers, the shaft M, having gear V and dropping-cups N N, and the chains W and Y, substantially as specified.

4. In a corn-planter, the section C, having the hoppers L, shaft M, double dropping-cups N N, and pinion V, and provided with the removable rack, lever, and seat, whereby it is adapted to be converted into a seed-drill, substantially as specified.

In testimony that I claim the above I have hereunto subscribed my name in the presence of two witnesses.

WILLIAM AUGUSTES HAZELRIGG.

Witnesses:
 BEN. I. KOOP,
 GERHARD FREDERICK FRANK.